United States Patent [19]

Comer et al.

[11] 4,280,276

[45] Jul. 28, 1981

[54] RECIPROCATING CUTTER

[75] Inventors: Robert C. Comer, Hopkins; Thomas F. Kruzel, Minneapolis, both of Minn.

[73] Assignee: The Toro Company, Minneapolis, Minn.

[21] Appl. No.: 113,206

[22] Filed: Jan. 18, 1980

[51] Int. Cl.³ .......................... B25F 3/00; B27B 11/10
[52] U.S. Cl. ..................................... 30/144; 30/166 A
[58] Field of Search .................. 30/144, 166 R, 166 A

[56] References Cited
U.S. PATENT DOCUMENTS

| | | | |
|---|---|---|---|
| 2,573,573 | 10/1951 | Jenkins . | |
| 3,143,798 | 8/1964 | Lundquist | 30/144 X |
| 3,217,408 | 11/1965 | Jepson | 30/144 |
| 3,309,769 | 3/1967 | Maxson | 30/144 |
| 3,364,574 | 1/1968 | Stelljes | 30/144 |
| 3,579,827 | 5/1971 | Grahn | 30/144 |
| 3,715,805 | 2/1973 | Fraser | 30/166 |

OTHER PUBLICATIONS

Stepler, R. L., "What's New in Tools", *Popular Science*, 9-1979, p. 99.

*Primary Examiner*—Jimmy C. Peters
*Attorney, Agent, or Firm*—James W. Miller

[57] ABSTRACT

A reciprocating cutter incorporating at least one saw blade and being optionally provided with a cooperating guard. The guard provides a protective cover for the blade or blades of the cutter and, through a spring-loaded biasing thereof, cooperates with the cutter to both stabilize the blade or blades and the workpiece and provide a degree of control for the movement of the cutter through the workpiece. The cutter, which may utilize a single reciprocating blade with which a spring-biased guard cooperates, in most instances will comprise a pair of alternately reciprocating blades, the teeth of which are selectively set to define a single clean kerf in the workpiece. The blade or blades can comprise the sole cutting device in a hand-held motor-driven implement, or alternatively can constitute an attachment, either permanent or removable, for a hand-held motor-driven hedge trimmer incorporating reciprocating trimmer blades to which the saw blades will be operably joined for simultaneous reciprocation therewith.

26 Claims, 37 Drawing Figures

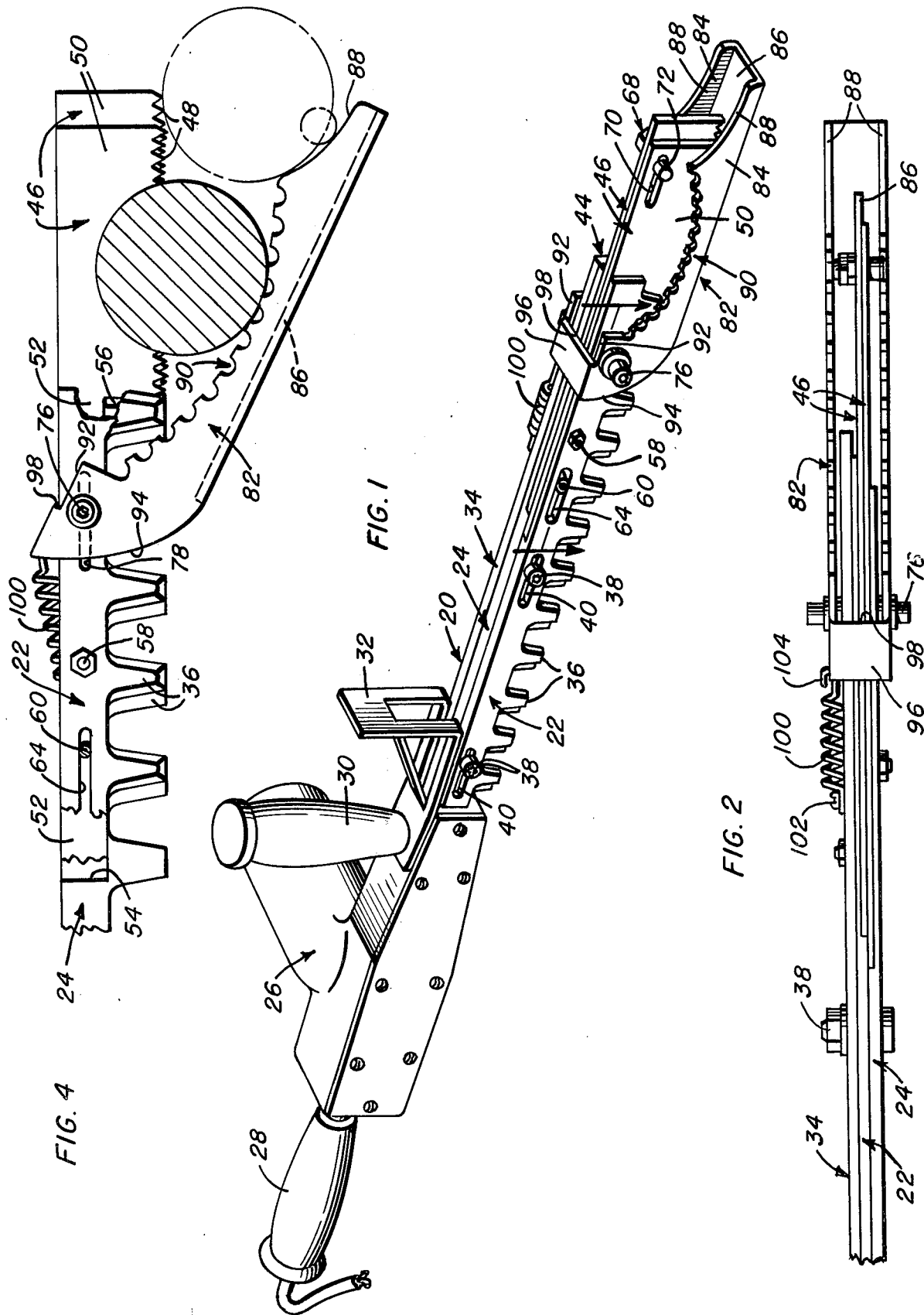

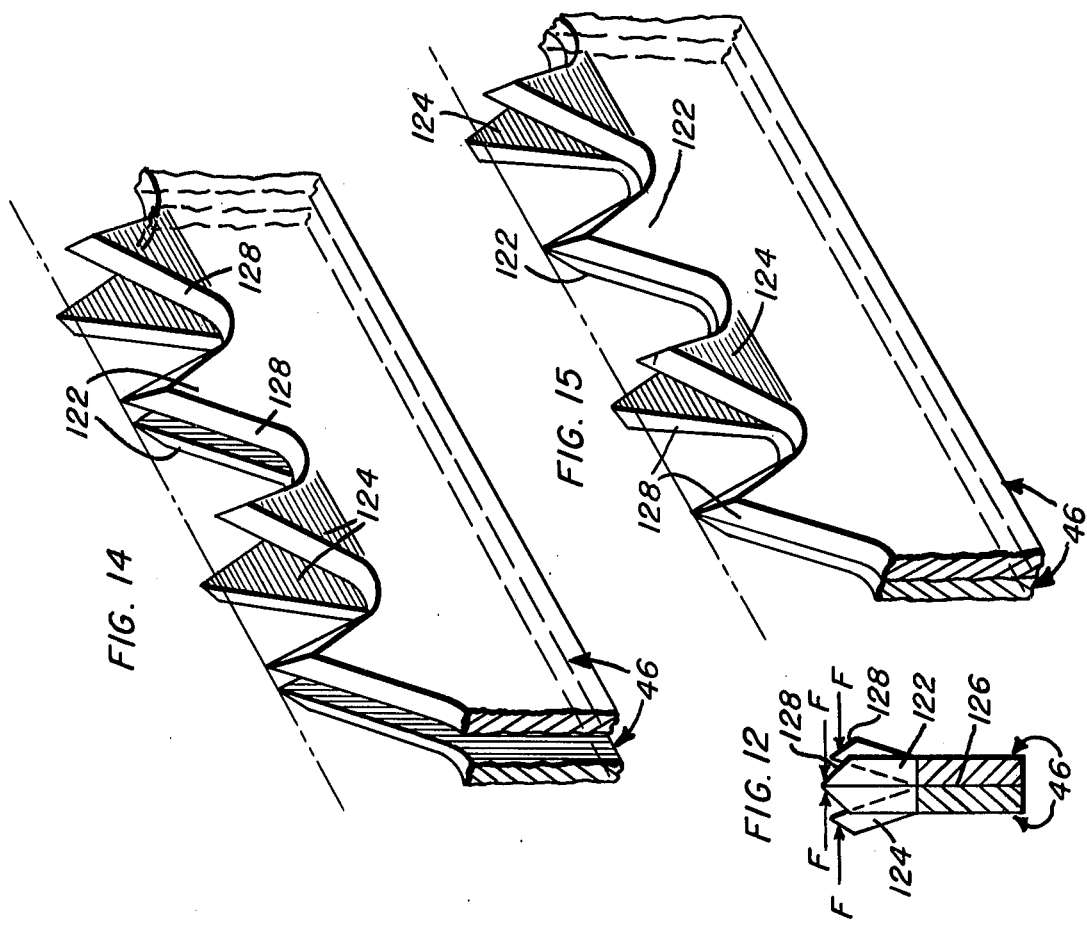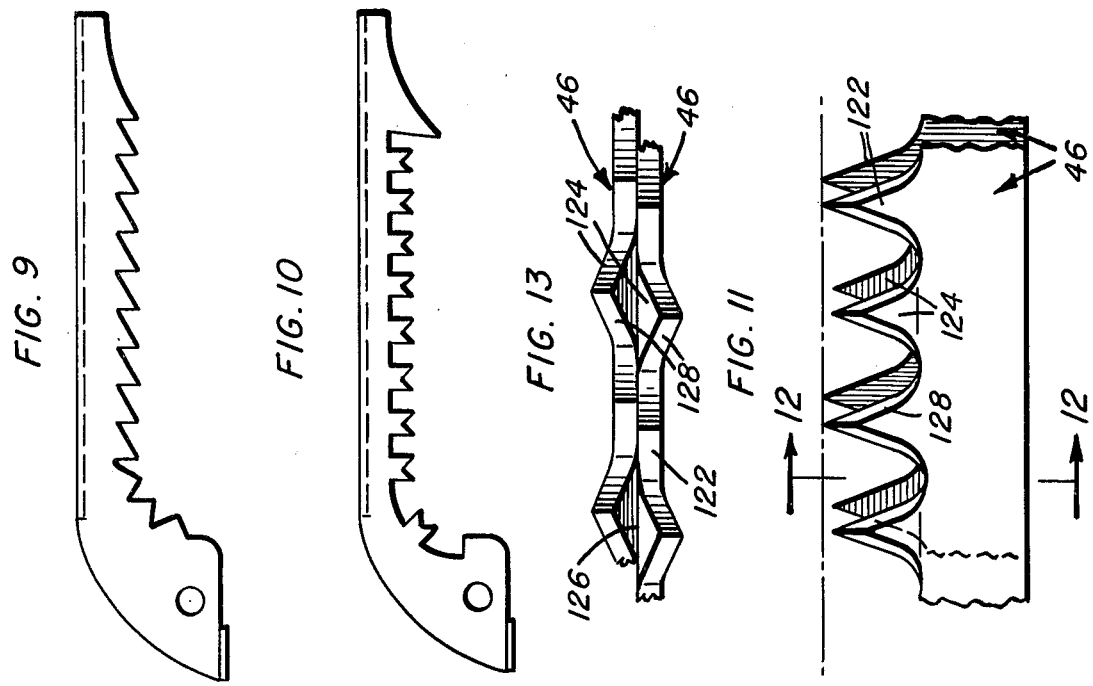

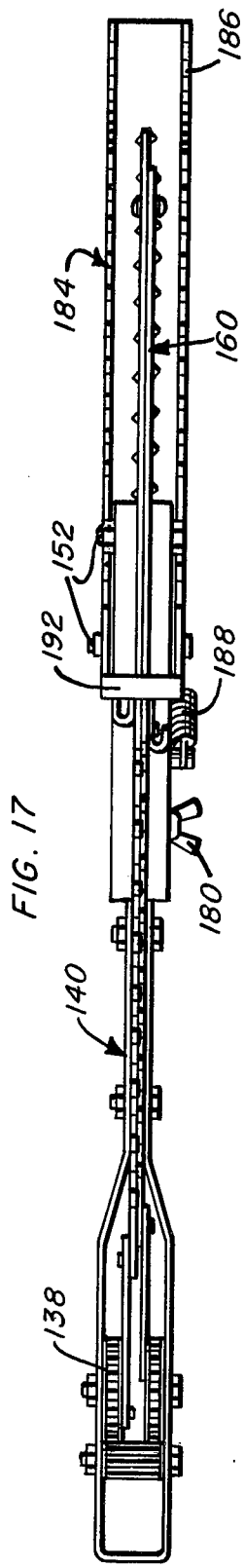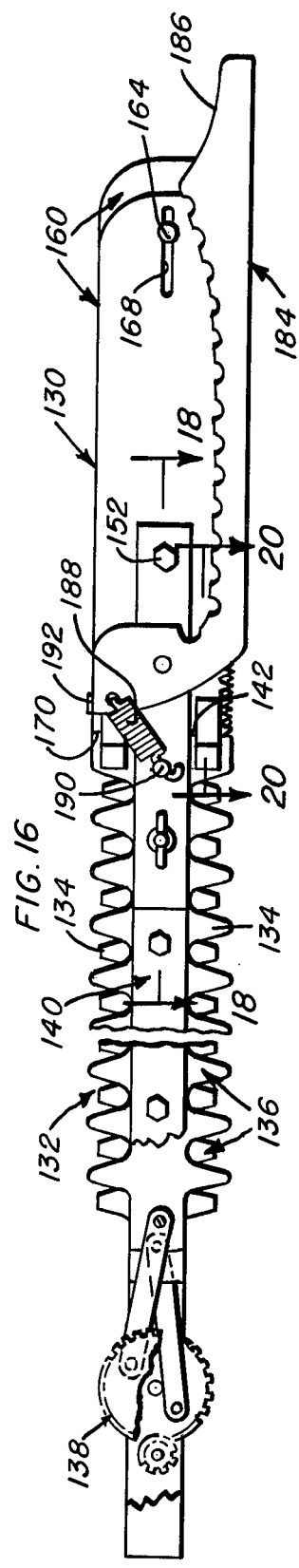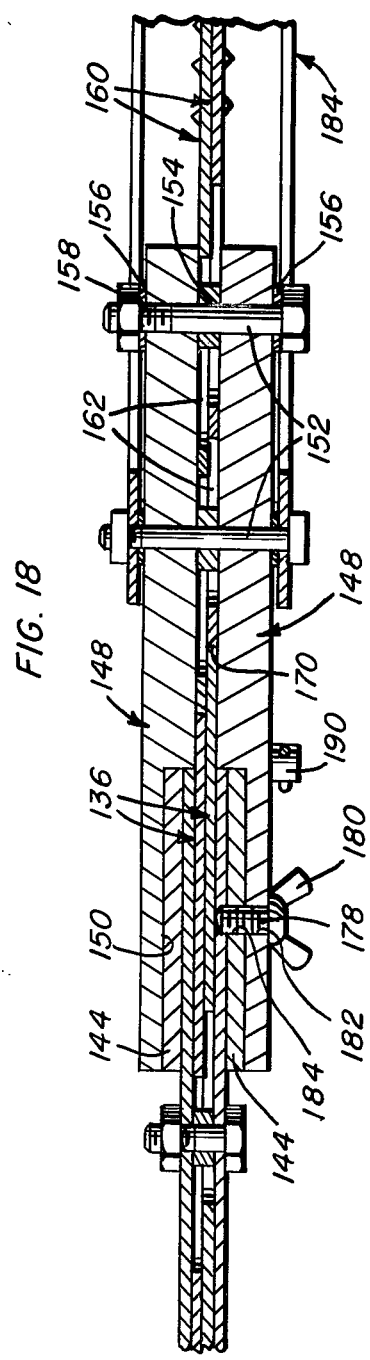

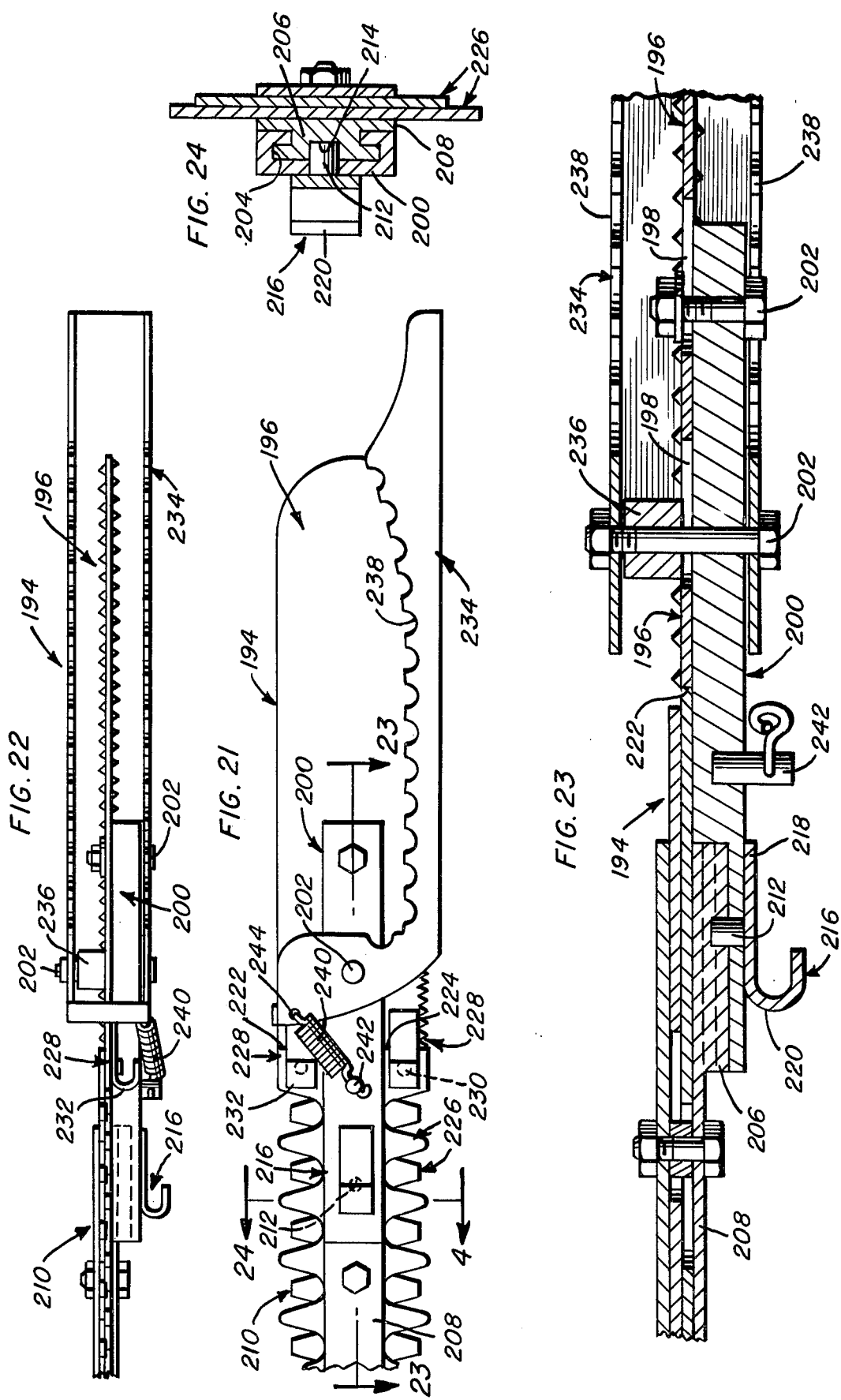

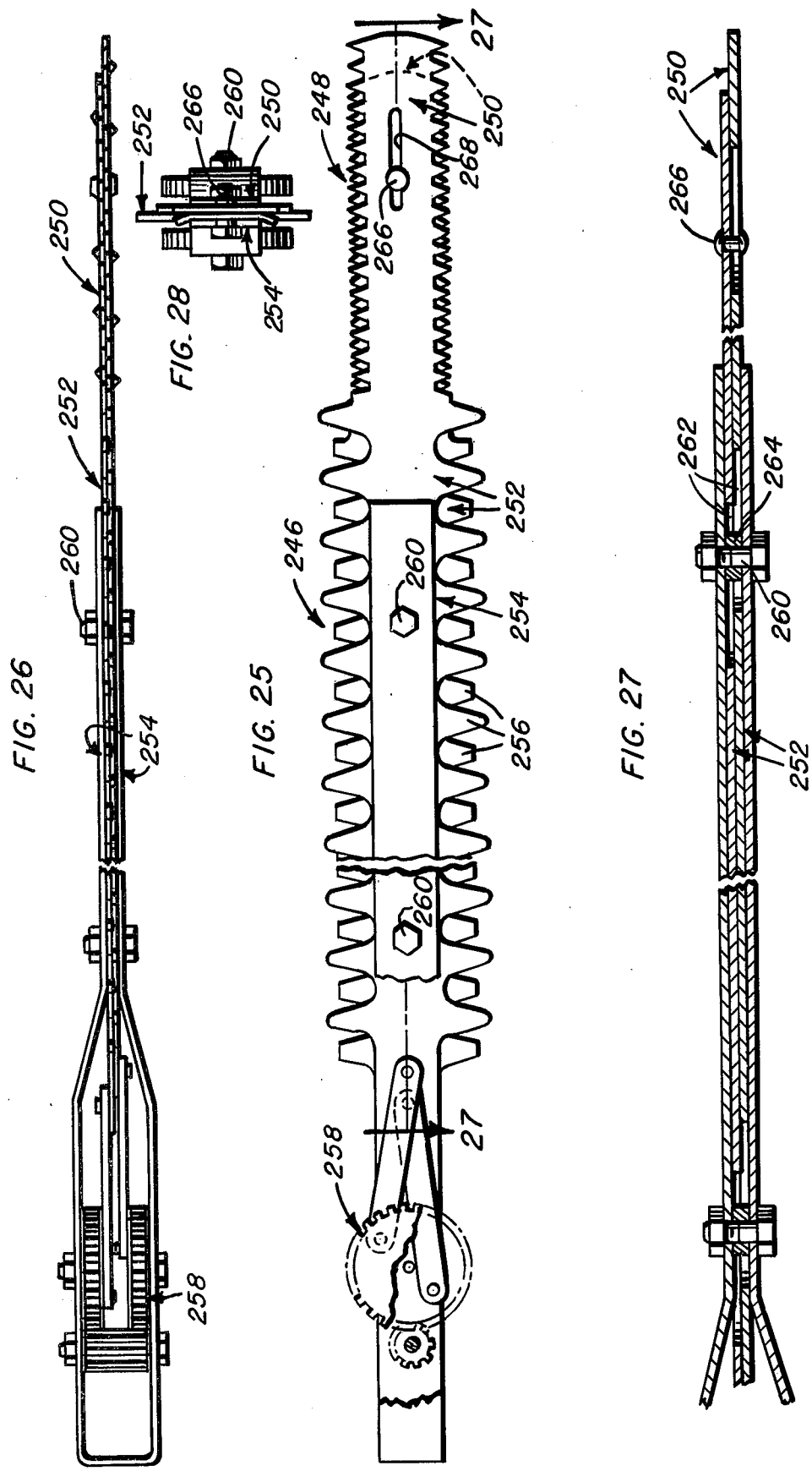

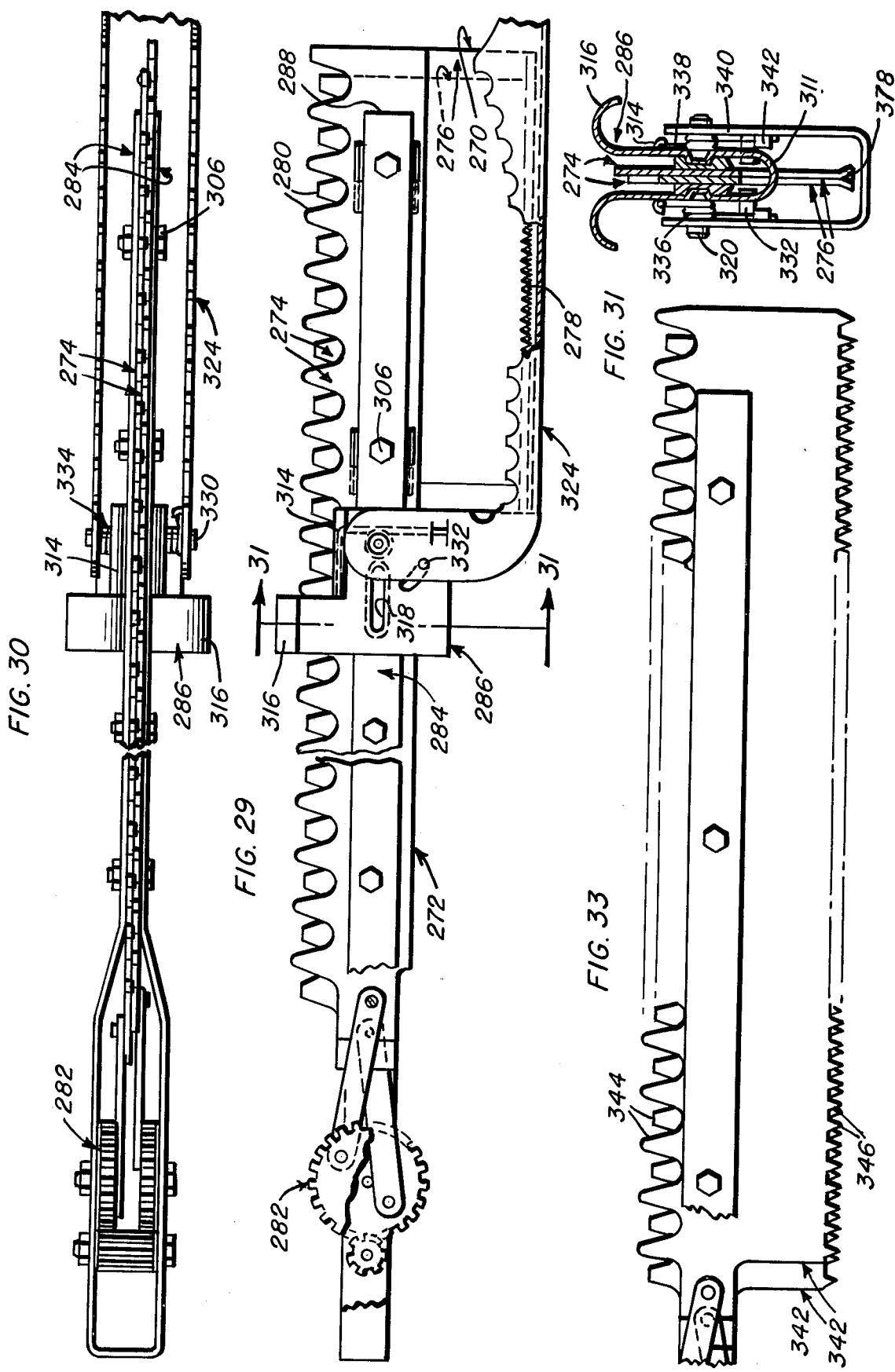

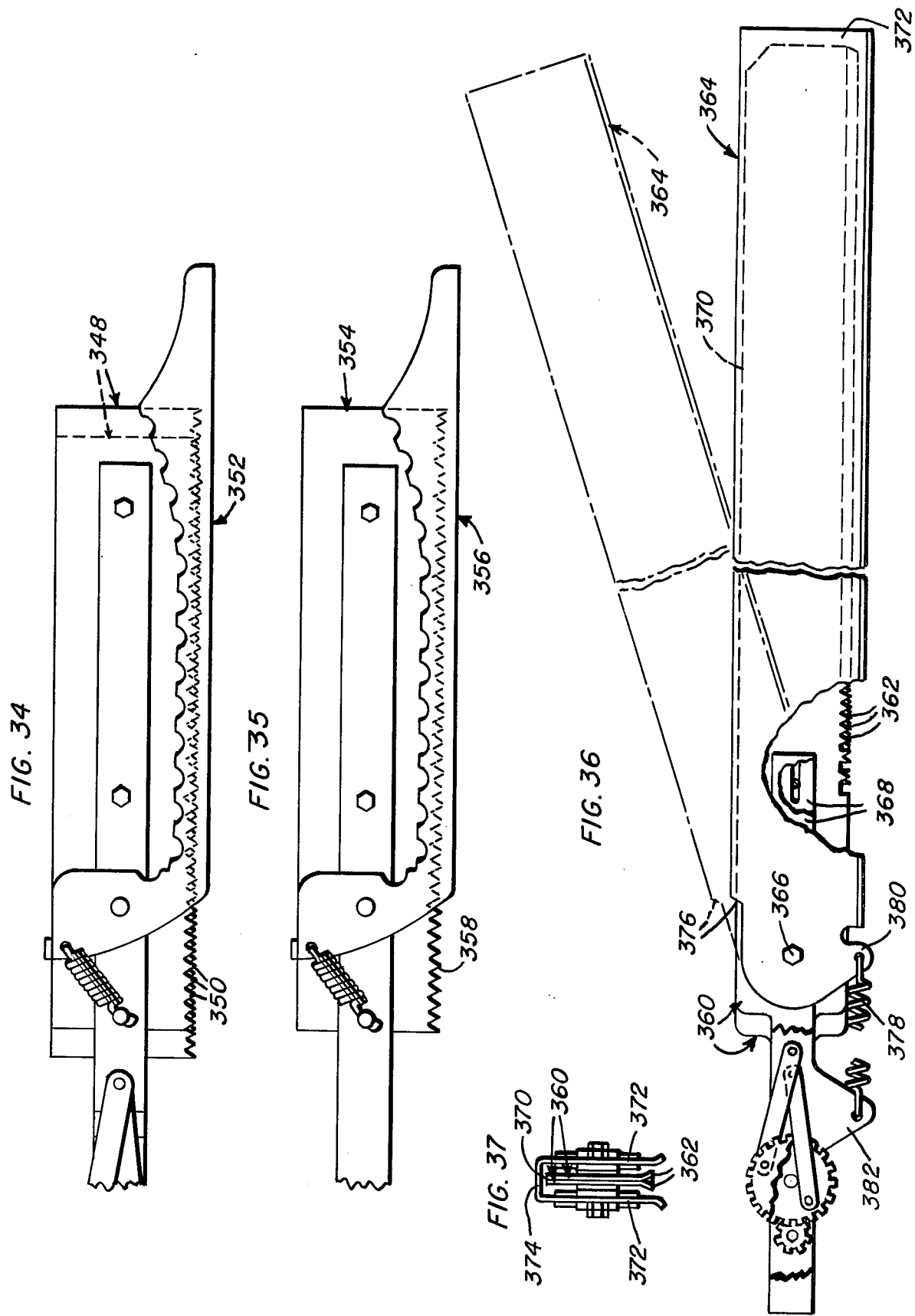

RECIPROCATING CUTTER

BACKGROUND OF THE INVENTION

The invention herein is directed primarily toward new and useful improvements in apparatus for the trimming and selective pruning of hedges, shrubs, trees, and the like.

Conventionally, the basic trimming operations heretofore have been effected by use of standard electric or gas hedge trimmers. Such trimmers, in their best known form, consist of two overlying blades, either both reciprocally driven or one fixed and one driven. Each of the blades incorporates at least one working edge with projecting shearing knives into which the plant growth is selectively introduced for a subsequent severing thereof during the reciprocating action. Such trimmers, while extremely efficient on smaller branches, tend to be less than satisfactory as the size of the individual branches increase. The larger branches or limbs must in effect be gnawed off by the shearing action of the trimmer knives rather than being severed by a single shearing stroke. This in turn produces a ragged and unsightly cut which becomes worse as the diameter of the limb increases because of the longer time to actually effect the cut.

The problem of accommodating heavier branches encountered during trimming operations has become increasingly difficult in light of recently introduced safety standards. For example, the Consumer Product Safety Commission has caused standards to be drawn up relative to the spacing of the trimmer knives to satisfy minimum safety trimmer requirements. Pursuant thereto, Underwriters Laboratories Inc., in its standard for electric hedge trimmers, revised paragraph 22.1 effective Mar. 24, 1978, notes that the blade assembly of a hedge trimmer shall be such that 0.75 inch (19.1 mm) diameter cylindrical probe applied to the blade assemblies with its axis normal to the shearing plane does not contact the shearing area. Industry has, in some instances, been even more stringent, requiring a spacing which will accept only a maximum diameter of 0.437 inch. With such standards, it will be appreciated that much of the peripheral larger branch or limb severing normally attempted with a conventional hedge trimmer will now be impossible.

While the trimming or pruning of larger trees and the like can be effected by power chain saws, such saws have been found to be potentially quite dangerous, particularly when attempting the use thereof on branches on the order of approximately three inches in diameter or less. This is due, in large part, to the flexibility or lack of beam strength in the branch, as well as the manner in which the cutting itself is effected. Further, the resultant cut while acceptable for rough lumber, would be unacceptable for ornamental shrubs, trees and the like.

The patent to C. E. Jenkins, U.S. Pat. No. 2,573,573, issued Oct. 30, 1951, discloses another form of power-driven wood saw wherein a reciprocating cutting action is involved using either a single blade or a pair of blades riveted together. This saw is intended for the cutting of logs, felling of tress, and other rough cutting operations. There appears to be no suggestion of the use of such a saw, or in fact an indication of the adaptability of such a saw, for the cutting of smaller branches such as might be encountered in the trimming or pruning of hedges, shrubs or the like in a home environment.

Page 99 of the September, 1979 issue of Popular Science refers to a saber saw on a hedge trimmer with a lever-operated clamp to cut heavy growth up to one inch diameter.

SUMMARY OF THE INVENTION

The present invention is concerned with apparatus for supplementing the capabilities of a conventional hedge trimmer in providing for the accommodation of limbs, branches, and the like greater than those which can be conveniently handled by a hedge trimmer, particularly under the new standards, and which are of a size that does not require, or in fact specifically preclude, the use of the potentially more dangerous conventional chain saws.

The invention herein proposes a reciprocating saw assembly which can comprise an extension of a hedge trimming tool, either as an integral part of the tool or as an attachment thereto, or can be in the form of a separate power tool utilizing its own power source.

When used as an adjunct to a hedge trimmer, the saw assembly greatly enhances the overall capability of the apparatus. Basically, the tool can be used in the manner of a conventional trimmer and, when encountering branches greater than those normally capable of being accommodated, manipulated to bring the saw assembly into operative engagement with the work. As an adjunct to a trimmer, whether as a removable attachment or a permanently assembled component, the saw assembly normally will incorporate two blades oppositely reciprocating in conjunction with the oppositely reciprocating blades of the trimmer. Further, the saw assembly, in most instances, will include a guard which performs multiple functions in addition to the basic function of guarding both the saw assembly and the user of the tool. For example, of particular significance is the ability of the proposed guard, with gripping teeth thereon, to act as a means for stabilizing the branch or limb being acted on by the reciprocating saw blade or blades. This becomes of particular importance when dealing with flexible branches or those with insufficient lateral stability or beam strength to resist excessive movement resulting from action of the reciprocating saw blades. The guard will also function both as a means for properly positioning the branch with regard to the saw assembly, and as an aid in moving the blade through the branch.

In providing for an effective reciprocating saw assembly utilizing a pair of oppositely reciprocating blades, the present invention proposes the use of a saw tooth arrangement specifically adapted to insure a smooth cut with a narrow kerf. As such, the blade teeth are configured and set to maintain the two blades in immediately adjacent planes, avoiding any tendency for the blades to collect material therebetween and/or separate. This basically involves retaining selected teeth in the plane of the blade while kerf setting the remaining teeth laterally outward relative to the plane of the blade to engage the outer wall of the kerf. The outer faces of the teeth, particularly the kerf set teeth, have the edges thereof beveled whereby an inwardly directed force will be developed thereagainst by engagement with the cut material and kerf so as to prevent any tendency for the blades to shift outward or separate.

The use of two equal and opposite reciprocating blades, powered independently or utilizing the motion of a double reciprocating trimmer, is significant in providing for a balanced cutting action which in itself tends to stabilize the work. As a matter of efficiency, the saw blades will preferably be formed to cut in both directions of stroke. However, two single cut blades with the blades cutting in opposite directions may also work well under certain conditions.

In a proposed variation, the invention also contemplates a reciprocating saw assembly as an independent tool utilizing two oppositely reciprocating saw blades movable in immediately adjacent parallel planes and incorporating the afore referred to tooth arrangement which avoids any tendency for the blades to separate laterally during use, thereby insuring maximum operating efficiency of the tool and the formation of a smooth narrow kerf.

As a further variation of the basic concept of a reciprocating saw assembly, it is proposed that a single reciprocating blade be provided. In order that the use of a single blade be practical for the cutting of limbs with little beam strength, that is limbs which will not provide sufficient resistance to movement for an effective cutting thereof by the reciprocating blade, it is necessary that a stabilizing guard be used. This guard, in addition to providing a protective enclosure for the teeth of the blade, is pivotally mounted and under a biasing load, whereby the branch is engaged and stabilized in direct opposition to the working edge of the blade, thereby providing an effective resistance to the movement of the branch during the severing thereof. Depending upon the configuration of the guard and the biasing load acting thereon, the guard also can function effectively as a means for properly centering the branch relative to the cutting edge and as a means for controlling movement of the blade into and through the branch.

Additional variations, objects and advantages of the invention will become apparent from the detailed description of the invention following hereinafter.

BRIEF DESCRIPTION OF THE DRAWINGS

FIG. 1 is a perspective view of the apparatus comprising the present invention;

FIG. 2 is a partial top plan view of the apparatus of FIG. 1;

FIG. 4 is an enlarged elevational view of the forward portion of the apparatus in an in-use environment and with portions broken away for purposes of illustration;

FIGS. 7, 8, 9 and 10 illustrate alternately formed guards;

FIG. 11 is an elevational detail of the two reciprocating saw blades;

FIG. 12 is a transverse sectional view taken substantially on a plane passing along line 12—12 in FIG. 11;

FIG. 13 is a working edge plan view of the blades of FIG. 11;

FIGS. 14 and 15 illustrate two moved or reciprocated positions of the blades;

FIG. 16 is a side elevational view of a variation of the apparatus of the present invention;

FIG. 17 is a top plan view of the apparatus of FIG. 16;

FIG. 18 is an enlarged cross-sectional detail taken substantially on a plane passing along line 18—18 in FIG. 16;

FIG. 21 is an elevational view of a further embodiment of the apparatus of the present invention;

FIG. 22 is a top plan view of the structure of FIG. 21;

FIG. 23 is an enlarged cross-sectional detail taken substantially on a plane passing along line 23—23 in FIG. 21;

FIG. 24 is an enlarged cross-sectional detail taken substantially on a plane passing along line 24—24 in FIG. 21;

FIG. 25 is a side elevational view of yet another embodiment of the present invention;

FIG. 26 is a top plan view of the apparatus of FIG. 25;

FIG. 27 is a cross-sectional detail taken substantially on a plane passing along line 27—27 in FIG. 25;

FIG. 28 is a front-end elevational view of the apparatus of FIG. 25;

FIG. 29 is a side elevational view, with portions broken away for purposes of illustration, of another embodiment of the apparatus of the present invention;

FIG. 30 is a top plan view of the apparatus of FIG. 29;

FIG. 31 is an enlarged cross-sectional detail taken substantially on a plane passing along line 31—31 in FIG. 29;

FIG. 33 illustrates an embodiment of the invention wherein the saw and trimmer blades are integral and both of full length;

FIGS. 34, 35 and 36 illustrate embodiments wherein the saw construction of the invention is utilized independently of a trimmer; and FIG. 37 is an end elevational view of FIG. 36.

DESCRIPTION OF PREFERRED EMBODIMENTS

Figure 3:
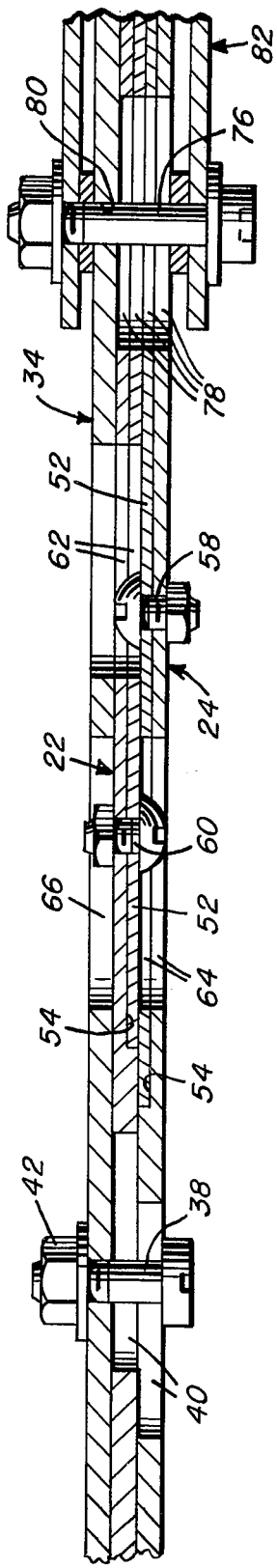
FIG. 3 is an enlarged partial longitudinal view taken substantially on a plane shown by the arrows in FIG. 1.

Initially, attention is directed to FIGS. 1 through 4 which illustrate a basic form of the invention wherein a substantially conventional electric hedge trimmer 20 has been modified pursuant to the teachings of the present invention.

The hedge trimmer 20 includes a pair of elongated oppositely reciprocating trimmer blades which, for purposes of description herein, can be respectively considered inner and outer blades 22 and 24. The blades 22 and 24 preferably move equal and opposite distances during the reciprocation thereof, with the driving of the blades being effected in a known manner utilizing a conventional motor and power train within a protective casing or housing 26. The housing 26 will incorporate appropriate handles which, as illustrated, may include a rearwardly projecting handle 28 and a laterally projecting handle 30 with an adjacent finger guard 32.

The trimmer blades 22 and 24 are stabilized by a bar 34 rigid with the forward end of the housing 26 and projecting forwardly therefrom parallel to and immediately adjacent the inner trimmer blade 22. This stabilizer bar 34 is of a length generally equal to the extended lengths of the trimmer blades 22 and 24 with the height of the bar 34 being no greater than that of the blades 22 and 24 between the back edges of the blades and the inner or root ends of the blade trimming knives 36. Thus with the back edge of the bar 34 being generally coplanar with the back edges of the trimmer blades 22 and 24, there is no projection of the forward edge of the bar 34 into the cutting area between the trimmer knives 36.

The blades 22 and 24 slidably mount on the stabilizer bar 34 by means of two or more spaced large-headed bolts 38, each of which engage through generally aligned longitudinally elongated slots 40 in the blades 22 and 24. The enlarged head of each of the bolts 38, of a size to preclude passage through the slots 40, slidably engages the outer face of the outer trimmer blade 24. The inner end portion of each of the bolts 38 engages through an aperture in the stabilizer bar 34 and into threaded engagement with a nut 42. The nut and bolt engagement is such so as to stabilize the blades 22 and 24 relative to the backing bar 34 and maintain a closely adjacent parallel relationship between the blades, while allowing for a power driven reciprocation thereof.

The above described basic trimmer 20, pursuant to the present invention, is adapted to mount and operate a saw blade attachment 44 for a direct powering and manipulation of the attachment from the trimmer itself, in effect functioning as an integral part thereof. This in turn substantially expands the capability of the basic trimmer and enables the severing of limbs greater than those which can be accommodated merely by the trimmer knives.

The blade attachment 44 includes a pair of parallel flat blades 46 positioned in face to face sliding engagement with each other. These saw blades 46, along the forward working portions 50 thereof, are of a height substantially equal to the height of the trimmer blades 22 and 24 and include saw toothed working edges 48 therealong defining continuations of the working edges of the two trimmer blades 22 and 24.

Each of the saw blades 46 also includes a rear body portion 52 of a height generally equal to the height of the trimmer blades between the back edges thereof and the roots of the knives. These rear portions 52 are received between the trimmer blades 22 and 24 with the inner or facing surfaces of the trimmer blades 22 and 24 being recessed, as at 54, so as to accommodate the saw blades without requiring any adverse lateral separation of the trimmer blades 22 and 24. Each of the recesses 54 need only be of a size so as to accommodate the associated reduced height rear body portion 52 of the corresponding blade 46, thus allowing for a retention of the full thickness of all of the trimmer knives 36, other than possibly the forwardmost knife 36 on each trimmer blade which, as suggested at reference numeral 56, may have a full height partial recess defined therein for accommodating the rear edge section of the full height working portion 50 of the corresponding blade 46.

Noting FIG. 3 in particular, a first one of the saw blades 46 has the rear body portion 52 thereof bolted to the outer trimmer blade 24 by appropriate bolt means 58. Similar bolt means 60 is used to rigidly secure the second saw blade 46 to the inner trimmer blade 22. Longitudinally elongated access slots through the inner trimmer blade 22 and associated saw blade 46, as at 62, align with the bolt means 58. Similarly, elongated slots 64 through outer trimmer blade 24 and the associated saw blade, and slot 66 through the stabilizer bar 34, align with the bolt means 60. The slots are specifically provided for the accommodation of the bolt means 58 and 60 as will be required during the longitudinal reciprocation of the trimmer blades 22 and 24, and associated saw blades 46 fixed thereto.

It is contemplated that the bolt means 58 and 60 cooperate with the recessed portions 54 of the trimmer blades 22 and 24 to provide a rigid attachment of the saw blades to the trimmer blades, forming operable integral extensions thereof. The actual forward working or cutting portions 50 of the blades 46 can be additionally stabilized for relative reciprocation by bolt or rivet means 68 which extends through a hole in one blade 46 (not shown) and an elongated aligned slot 70 in the second blade 46. This bolt means, including an enlarged head 72 on one end thereof, while retaining the blades in adjacent parallel relation to each other, does so in a manner whereby a free reciprocation of the blades is possible. Finally, in order to insure a linear alignment of the saw blades 46 with the trimmer blades 22 and 24, a stabilizing bolt 76 extends transversely through aligned slots 78 through the trimmer blades and the saw blades, toward the outer ends of the trimmer blades, and through a bolt hole 80 in the stabilizer bar 34. The bolt 76, incorporating an appropriate enlarged head on one end and an internally threaded nut on the second end, provides a bearing surface, particularly for the saw blades 46, to stabilize these blades during the reciprocal driving thereof.

As will be appreciated from the drawings, the stabilizing bolt 76 provides another significant function, that of pivotally mounting the guard 82.

Guard 82 is intended for cooperation with the saw blades 46, independently of the trimmer blades 22 and 24, with the trimmer blades at all times remaining exposed for use of the apparatus in the manner of a conventional trimmer. Structurally, the guard 82 includes a pair of laterally spaced elongated side panels 84. A bottom panel 86 integrally connects the straight lower edges of the side panels 84 along the full length thereof and is so positioned as to underlie the toothed working edges 48 of the saw blades 46. In order to facilitate introduction of a limb, branch or the like to the operative area of the saw blades, the guard 82 projects an appreciable distance, for example 1½ inches, beyond the leading ends of the blades 46.

The side panels 84 include upper edges which are of a height sufficient to enclose the working edges 48 of the blades 46 in the closed position of the guard 82. In addition, these upper guard side plate edges are specifically configured both to facilitate the introduction of a branch and to provide a positive gripping force thereon for a stabilization of the branch and the reciprocating blades relative to each other. Each side panel upper edge, rearward from the forward end thereof, includes a slightly arcuate upwardly and rearwardly inclined edge portion 88 extending from closely adjacent the lower edge rearwardly and upwardly to a point inward of the leading ends of the saw blades 46 and substantially above the working edges thereof.

The upper edge of each of the side panels 84 then proceeds in a downward and rearward generally semi-circular section 90 which will normally have a series of gripping teeth defined along the full length thereof. The semi-circular or arcuate laterally spaced upper edge sections 90 of the two side panels 84 thus form a positive seat for receiving and stabilizing a branch during the operation of the apparatus. Each semi-circular toothed portion 90 of the side panels 84 terminates in a flat rear upper edge portion 92 which, in the closed position of the guard 82, is substantially coplanar with the back edges of the trimmer blades and saw blades. As will be noted, the rear edges 94 of the side panels 84 also curve upwardly to the upper edge portion 92, providing a relatively wide planar portion for the reception of the mounting bolt 76 therethrough.

The guard is completed by a top panel 96 spanning the rear upper edge portions 92 and being integrally bonded thereto, as by welding, slightly rearward of the pivoting axis of the guard 82 defined by the bolt 76. Positioned in this manner, the forward edge 98 of the top panel 96 acts as a positive stop or limiting means controlling the opening of the guard 82. This will possibly be best appreciated from FIG. 4 wherein the guard is illustrated in its extreme open position. Further, as will be appreciated, the top panel 96 also defines a limiting means or stop for the guard 82 in the closed position thereof, the relationship among the top panel 96, the pivot defining bolt 76, and the back edges of the blades being such as to allow for a closed swinging movement of the guard 82 to a position wherein the guard bottom panel 86 parallels the toothed cutting edges 48 of the saw blades 46 in slightly spaced relation thereto. This enables an operation of the apparatus as a trimmer including a reciprocation of the saw blades 46, without fear of engagement of the working edges of these saw blades with the closed guard.

Guard 82 preferably is spring biased to a closed position to insure a protective enclosure of working edges 48 in the absence of a workpiece, thus minimizing the possibility of damage to the edges as well as providing a safety factor with regard to persons in the immediate vicinity.

The spring load can be provided, as illustrated in the drawings, by a coiled tension spring 100 having one end thereof affixed to the back of the stabilizer bar 34 by an appropriate anchoring screw 102, and the forward end thereof affixed to the upper portion of the corresponding guard side panel 84, above the pivot axis defined by the bolt 76, in any appropriate manner, such as by a hooking of this spring end through an aperture in the side panel 84 as suggested at 104. By engaging the guard side panel 84 above the pivot axis it will be appreciated that a positive closing force will be constantly applied to the guard with the guard, assuming the absence of a workpiece, pivoting to a completely closed position with the top panel 96 defining a stop or abutment immediately prior to engagement of the bottom guard panel 86 with the saw working edges 48. While a spring load on the guard is preferred, it should be appreciated that other appropriate guard controlling means can be used, including hand or weight operated mechanical linkages.

The provision of dual reciprocating blades 46 is of particular significance in providing for a balanced cutting action and a substantial degree of stability, with or without the guard, as long as the beam strength of the material or branch being cut is sufficient to resist the force necessary to move the saw assembly through the cut. In those instances wherein the beam strength of the branch is insufficient to resist the vibratory forces developed by the saw apparatus, the spring-loaded guard will act so as to lock the branch in a stable cutting position and provide the necessary resistance to the force of the cutting action developed by the reciprocating blades 46.

The laterally spaced guard side panels 84, with the toothed gripping edges thereon, will engage the branch or workpiece to the opposite sides of the reciprocating blades 46 and thus effectively retain the branch against movement directly in the vicinity of the cut. This severing can be effected regardless of the beam strength of the branch and will result in a smooth severing, as opposed to a ragged torn edge which would normally result from an attempt to sever an unsupported branch.

In order to perform this unique function of stabilizing the workpiece or branch, in addition to its function as a safety providing guard, the guard 82 will utilize a biasing means, designated as spring 100 in the drawings, which exerts a force greater than that normally required to merely insure a closure of the guard 82 over the cutting edges 48 of the blades 46. Basically, it is contemplated that the guard 82 be biased with sufficient force to provide for a positive gripping and retention of the workpiece against the reciprocating blades. At the same time, the guard, through the ramped forward edge portions 88, is to open outwardly with a degree of ease, so as to allow for an introduction of a branch through a direct lateral movement of the extended end of the guard 42 against the branch. The smooth ramped leading end on the guard provides for easy entry of the material to the cutting position with the power on. This is particularly important in that with a limb locked in cutting position and the power off, the normal starting torque plus the torque required of a preloaded system may, and probably will, exceed the power available. In a gasoline powered unit the engine will simply die. In an electric powered unit with a thermal cutout, repeated irritating delays may occur.

Even in those instances wherein the beam strength of the material provides sufficient resistance to insure a proper cutting thereof by the reciprocating blades in the absence of the retaining force provided by the guard, the use of the guard will still be of substantial value. For example, the arcuate toothed edge portions 90 can be used to center the limb relative to the length of the reciprocating saw blades to position the maximum diameter of the limb centrally of the length of the blades and thus obtain the maximum benefit from the cutting stroke. Further, the biased guard can be used as a means for effecting a constant force moving the reciprocating blades through the workpiece, thus relieving the operator of the necessity for applying such a force to the apparatus and allowing the operator to concentrate merely on a guiding of the device. In those instances wherein the beam strength is substantial, additional manual force can be applied to the device for effecting a more rapid movement of the saw through the work than that which would be achieved by merely relying on the spring-load of the guard to feed the saw.

Figure 5:
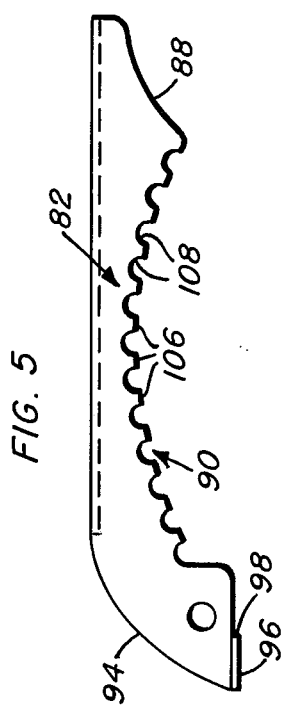
FIG. 5 is a side elevational view of the guard illustrated in conjunction with the apparatus of FIG. 1.
Figure 6:
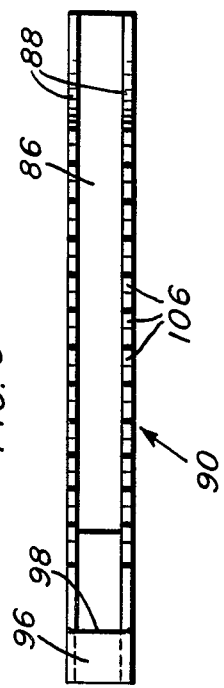
FIG. 6 is a plan view of the guard of FIG. 5.
Figure 19:
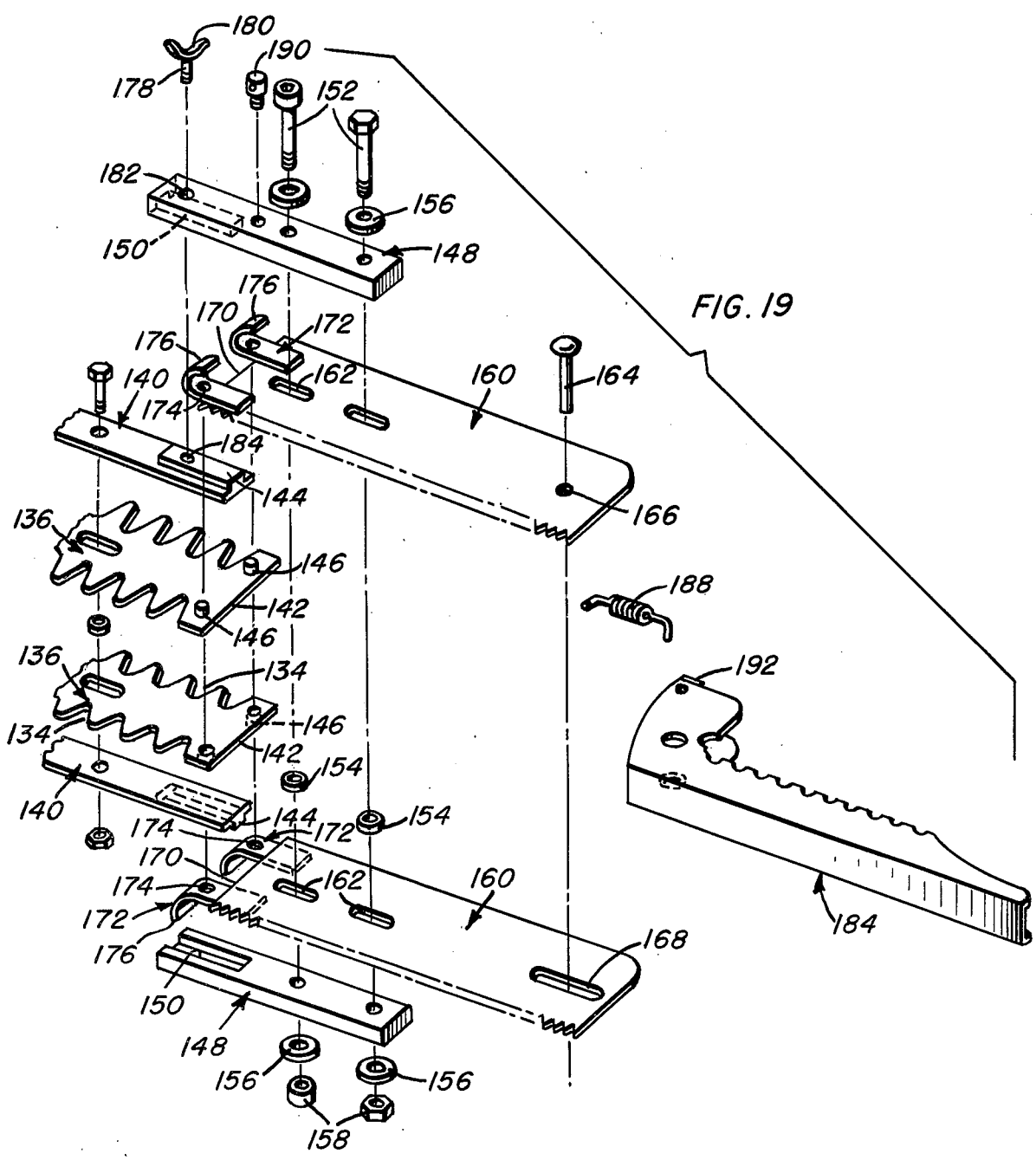
FIG. 19 is an exploded perspective view of the various components of the apparatus of FIG. 16.
Figure 20:
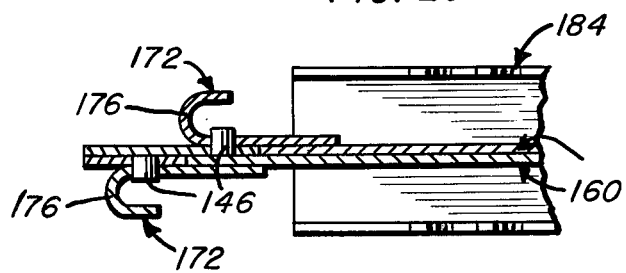
FIG. 20 is an enlarged cross-sectional detail taken substantially on a plane passing along line 20—20 in FIG. 16.
Figure 32:
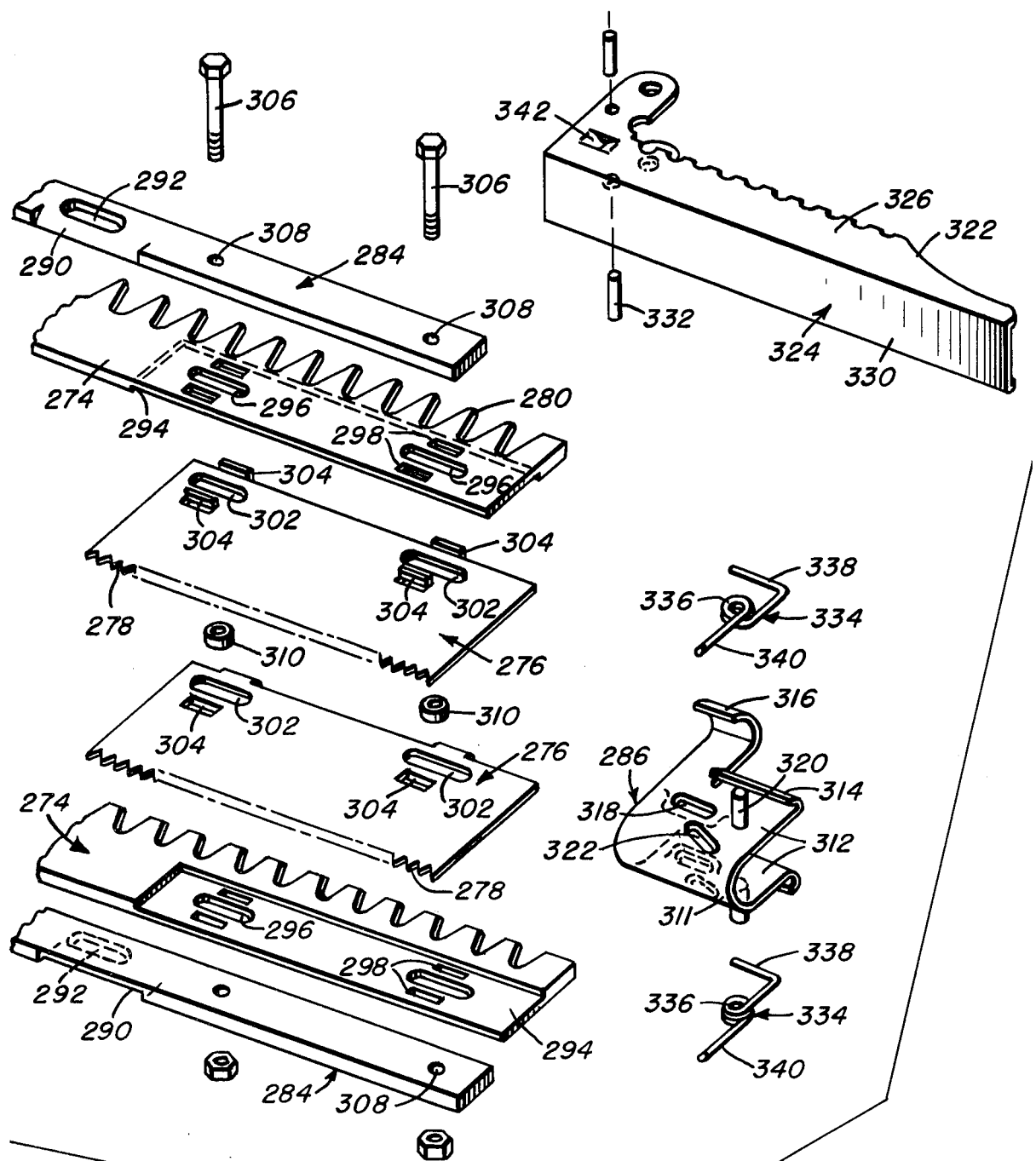
FIG. 32 is an exploded perspective view of the various operative components of the apparatus of FIG. 29.

The guard of the embodiment of FIGS. 1-4 is shown independently in FIGS. 5 and 6. It will be noted that the toothed portions 90 include series of truncated teeth 106 separated by arcuate recesses 108 with the teeth being arranged on a semi-circular arc. It is contemplated that the arc be such that the chord thereof be at least approximately as long as the length of the toothed working edges 48 of the saw blades 46.

Figure 7:
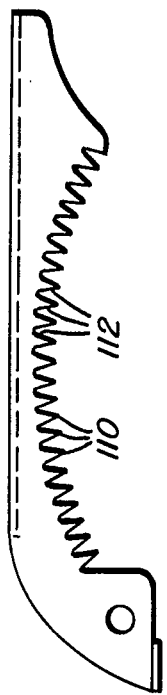

FIG. 7 illustrates a similar guard, differing only in that the guard teeth 110 are sharply defined and separated by the shaped recesses 112 having slightly rounded inner ends.

Figure 8:
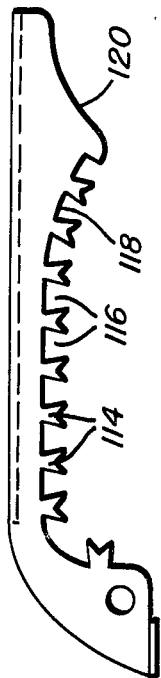

Another form of guard is illustrated in FIG. 8 with the teeth 114 of this guard being in the nature of flared bifurcated elements presenting two limb engaging tips. Each of the teeth 114 are separated by a generally dovetailed slot 116 incorporating a flat base 118. The toothed edge of the guard of FIG. 8, rather than being on a circular arc, is generally linear, arcing only at a point immediately inward of the inner end of the corresponding edge ramp 120.

Other tooth and tooth edge configurations contemplated for the basic guard are illustrated in FIGS. 9 and 10. In each instance, the toothed edges are linear, rather than following an arcuate or partially arcuate path. However, such guards also specifically incorporate the ramped outer end so as to facilitate engagement of the guard with the workpiece and introduction of the workpiece to a retained position engaged with the toothed gripping edges of the guard in direct opposition to the toothed working saw edges 48. The specific configuration of the guard teeth, as well as the arrangement thereof along the edges of the side panels of the guard, can vary. Basically, however, the toothed edges of the guard must be capable of effecting a firm and positive grip on the workpiece so as to retain the workpiece against any tendency for shifting or vibrating during the cutting operation. This becomes particularly significant wherein the workpiece has little inherent beam strength.

Attention is now directed to FIGS. 11 through 15, wherein enlarged segments of the cooperating saw blades 46 have been illustrated. Of particular significance with regard to the saw blades is the ability thereof, while rapidly reciprocating, to be maintained in close sliding engagement with each other in a manner which resists any tendency to separate, and form a double and/or ragged kerf.

The blade teeth along each of the toothed working edges of the planar blades 46 include a first set of teeth 122 and a second set of teeth 124. The teeth 122 are coplanar with the respective blades 46. The teeth 124, normally alternating with the teeth 122 of the first set, are outwardly set to one side only of the corresponding blade 46 at what can be considered a kerf set, defining the width of the formed kerf. The alternating planar and kerf set teeth 122 and 124 are desired to provide for a smooth operation of the blades without binding, jamming or the like. It is particularly desirable that the planar inner faces of the blades 46 be retained in a generally common plane, designated by reference numeral 126. This is effected against the normal tendency for the blades to separate slightly during use, particularly in view of the kerf set blades 124, and to provide a ragged cut, and in some instances a double kerf. Resistance to this tendency for lateral movement of the blades 46 away from each other is effectively provided for by a beveling, as at 128, of the outer edges of the teeth, both the teeth 122 and the teeth 124. In this manner, as suggested in FIG. 12, inwardly directed forces F are developed during operation of the blades by engagement of the beveled edges with the work, these inwardly directed forces insuring retention of the blades in closely adjacent, and in fact sliding engagement with each other. In addition to preventing double kerfing, and the increased power requirements resulting therefrom, the inward retention of the blades relative to each other also produces a substantial reduction in the vibration of the operating blades, thus further enhancing the effective operation thereof and the smoothness of the cut produced thereby.

While only one basic tooth form has been illustrated, it is to be appreciated that other tooth forms may be used depending on the nature of the wood to be cut or the work to be performed. However, in each instance the alternating planar and kerf set arrangement, as detailed above, is to be maintained.

Attention is now directed to FIGS. 16 through 20 which present an embodiment of the invention wherein the saw assembly 130 comprises a separate attachment capable of being conveniently attached to or detached from a trimmer 132. The trimmer 132, in the absence of the saw attachment, functions and is used in the manner of a conventional trimmer, without the necessity of making allowances for or accommodating the end projecting saw attachment as would be the case with a permanent or semipermanent attachment.

While the concept of providing a detachable saw assembly can be used with a basic single edge trimmer of the type illustrated in FIG. 1, for purposes of setting forth the full versatility of the invention, the embodiment of FIGS. 16–20 utilizes a trimmer 132 which incorporates full length opposed trimming edges 134 on the trimmer blades 136. The blades 136 are reciprocately driven in equal and opposite directions utilizing any conventional power source and drive means as schematically suggested at 138. Appropriate housing and handle means will be incorporated into the basic trimmer structure 132, as well as a pair of stabilizing bars 140 paralleling the blades 136 along the outer faces thereof from the proximal driven ends to a point short of the flat distal ends 142. The provision of the flat ends 142 on the trimmer blades 136, along with the termination of the stabilizer bars 140 short of these ends 142 constitute modifications in the basic trimmer construction for the accommodation of the detachable saw blade unit 130. Another structural variation from what might be expected on a conventional trimmer is the provision of elongated integral ribs 144 on the outer faces of both stabilizer bars 140, each rib 144 projecting a relatively short distance inward from the other distal end of the bar. Finally, each of the trimmer blades 136 includes, on the outer face thereof adjacent the remote end 142, a pair of laterally spaced projecting lugs 146, the lateral spacing of the lugs 146 being such so as to position them to the opposite sides of the corresponding stabilizer bar 140. These modifications to the basic trimmer construction, while structurally simple, are unique in providing positive means for effecting a rigid operable attachment of the saw assembly 130 to the trimmer unit 132 without in any way interfering with the use of the trimmer 132 in the manner of a conventional trimmer either with or without the attachment 130 mounted thereon.

Turning now to the detachable saw assembly 130 itself, the basic mounting thereof on the trimmer 132 is effected by a pair of elongated bar-like support arms 148 which, when mounted, form in effect extensions of the stabilizer bars 140. Each of the support arms 148 includes an elongated groove or recess 150 which mates with and snugly receives the rib 144 on the corresponding stabilizer bar 140. The forward portions of the support arms 148 receive a pair of bolts 152 therethrough, fixing the support arms in spaced parallel relation to each other with the actual spacing between the arms 148 being provided by a spacer 154 positioned on each bolt between the support arms 148. Appropriate washers 156 and nuts 158 will be provided for a completion of the bolt assemblies.

The spacers 154 are such so as to maintain a space in between the support arms 148 sufficient to accommodate the reciprocating saw blades 160 in a manner which tends to retain the blades in close parallel relationship to each other without a binding thereof. The desired relationship between the blades 160, to provide a single kerf and avoid a separation of the blades, particularly at the cutting edges thereof, is further enhanced by forming the blade teeth in the manner detailed supra with regard to FIGS. 11 through 15.

The two blades 160 are positioned between the outer portions of the support arms 148 and the bolts 152, along with the spacers 154, are received through a pair of aligned elongated slots 162 provided in each of the blades 160. These slots 162 are of a size so as to freely receive the spacers 154 throughout the full range of reciprocation of the blades 160. The spacers 154, in addition to performing their primary spacing function, will also avoid any tendency for the reciprocating blades 160 to wear on the bolts 152 themselves. The outer ends of the blades will be retained in free sliding adjacent relation to each other by an appropriate rivet or bolt means 164 which engages through a circular aperture to hole 166 in one blade 160 and elongated reciprocation allowing slot 168 in the second blade 160.

The inner end 170 of each of the blades 160 is flat and adapted, upon a mounting of the blade attachment 130, to abut directly against the flat outer end 142 of the corresponding trimmer blade 136. In addition, each saw blade 160 includes a pair of laterally spaced rigid mounting clips or straps 172 fixed to the outer face of the blade 160 and projecting rearwardly therefrom to overlap the outer face of the forward portion of the corresponding trimmer blade 136 to the opposite sides of the stabilizer bar 140. Each of the clips or straps 172 includes an aperture 174 therethrough of a size to closely receive one of the projecting lugs 146 on the corresponding trimmer blade 136. In addition, each of the straps 172 includes a laterally curved outer end portion 176. The mounting straps 172 are substantially rigid, being capable of only the slight degree of flexing required to move over the lugs 146 for an engagement of the lugs 146 through the apertures 174. The straps 172 can be outwardly flexed, by a manual outward pulling thereof, in conjunction with a sliding of the blade assembly 130 onto the forward end portion of the trimmer 132. However, it is more likely that the straps, through the outwardly curled end portions 176, will merely automatically ride up over and into engagement with lugs 146 as the blades 160 are slid into position with the flat inner ends 170 thereof engaging the flat forward ends 142 of the trimmer blades 136. Once engaged with the lugs, the inherent resiliency of the straps 172 will maintain the engagement until the straps are manually outwardly flexed and released.

The mounting of the saw blade assembly 130 thus includes both an engagement of the saw blades 160 directly with the trimmer blades 136, and the aforedescribed rib and groove engagement of the support arms 148 with the stabilizer bars 140.

With the support arms 148 fully seated on the stabilizer bars 140, a bolt 178, preferably with an enlarged manually manipulatable head 180 thereon, is engaged through an aperture 182 in the inner portion of one of the support arms 148, in alignment with the recess 150 therein, and into a blind internally threaded bore 184 defined in the aligned rib portion of the corresponding stabilizer bar 140. This single bolt 178, in conjunction with the mating ribs 144 and grooves 150, and the lug engaged mounting straps 172, provide for a positive physical and operational mounting of the saw assembly 130 on the basic trimmer 132. The actual mounting of the saw assembly requires only a rearward sliding of the previously assembled components onto the forward portion of the trimmer 132, the mounting straps 172 automatically engaging with the lugs and the support arm grooves 150 aligning with and sliding over the stabilizer bar ribs 144. Upon a full seating of the saw assembly, the threaded mounting of the single bolt 178 completes the mounting. Removal of the saw assembly requires merely a removal of the single bolt 178, an outward release of the mounting straps 172, and a forward sliding of the assembly 160, thus freeing the basic trimmer for use in the conventional manner without any incumberances.

As will be appreciated from the drawings, it is contemplated that the saw blade attachment assembly 130 incorporate a spring loaded guard 184 which is similar in construction, manner of mounting, and operation to the previously detailed guard 82. As such, the guard 184, in addition to its basic function of providing an adjustable safety enclosure for the working edges of the blades 160, also performs the highly significant function of stabilizing the branch or workpiece and feeding the saw through the workpiece. This is of particular significance in those instances wherein the beam strength of the workpiece is not in itself sufficient to allow for efficient operation of the saw assembly. As will be noted, the guard 184 includes a ramped forward end 186 to allow for a manipulation of the guard by direct engagement thereof with the workpiece, and an introduction of the workpiece without requiring any direct manual handling of either the guard or the workpiece. In this manner, the workpiece can be introduced after activation of the saw assembly. This in turn provides for a much smoother operation of the apparatus and avoids any tendency for the apparatus to stall or fail to start, such as might occur were the workpiece jammed between the guard and the blades prior to an activation of the blades.

The actual spring loading of the guard 184 or the introduction of the biasing force therein is preferably provided for by a coiled tension spring 188 engaged between a stud or lug 190 mounted on one of the support arms 148 and an aperture through one of the side panels of the guard to the opposite side of the pivot means mounting the guard from the blade enclosing portion of the guard. Incidentally, it will be appreciated that the innermost of the support arm bolts 152 functions as the pivotal mounting means for the guard 184. Further, the guard 184, as with the previously described guard 82, includes appropriate abutment means, in the form of a small top panel 192, which limits the opening swinging movement of the guard. This in turn insures a constant biasing force toward the closed position of the guard. The top panel 192 also determines the closed position of the guard at a point wherein the toothed edges of the blades 160 are enclosed but not contacted.

A variation of the just described detachable saw blade assembly is illustrated in FIGS. 21 through 24. In this embodiment, the saw blade assembly 194 utilizes a single reciprocating blade 196. The single blade 196 includes a pair of longitudinally elongated slots 198 therethrough, generally along the longitudinal center line thereof and toward the proximal or rear end of the blade 196.

A single support arm 200 overlies the rear portion of the blade 196 and projects rearwardly therefrom. A pair of nutted bolt assemblies 202 extend through a pair of longitudinally spaced apertures in the support arm 200 and through the aligned blade slots 198 for a mounting of the blade 196 on the arm 200 in a manner whereby the blade is free to longitudinally reciprocate relative to the support arm, while at the same time being restricted against movement in any other direction.

The rearward or proximal end portion of the support arm 200 includes an undercut groove 204 defined therein inwardly from the extreme end of the arm 200. As will be best appreciated from the cross-sectional detail of FIG. 24, the groove or recess 204 is undercut along both of the opposed sides thereof. This groove 204 is closely received over a similarly configured undercut rib 206 defined on the outer or distal end of one of the stabilizer bars 208 of the trimmer 210. Inasmuch as the groove and rib interlock precludes movement of the support arm 200 relative to the stabilizer bar 208 in any direction other than longitudinal, a complete locking of the arm 200 to the bar 208 can be effected by merely positioning a removable pin or lug 212 through an aperture in a portion of the arm 200 aligning with the groove 204 and into an aligned bore 214 defined in the stabilizer bar rib 206. This lug 212, for ease of manipulation, can be affixed to a resiliency flexible strap 216, one end portion 218 thereof being fixed to the support arm 200 in a manner whereby an outward flexing of the strap 216, through manipulation of a reversely curved grip 220 provided at the second end thereof, will effect an outward withdraw of the lug 212 during either a mounting or removal of the saw blade assembly 194.

The saw blade 196 itself includes, at the proximal or near end, a flat edge 222 which abuts against the flat forward or distal edge 224 of one of the two normally provided trimmer blades 226. In addition, this proximal end of the saw blade 196 includes upper and lower rearwardly projecting mounting straps 228 which, while incorporating a slight degree of resilient flexibility, are relatively rigid and capable of locking the saw blade 196 to the trimmer blades 226 in a manner to provide a rigid joining of the saw blade to the trimmer blade for operation thereof as a single unit. The actual interengagement, as described in conjunction with the previous embodiment, includes an aperture in the projecting rear portion of each of the straps 228 which receives an outwardly projecting lug 230 on the trimmer blade 226. The reversely curled rear portion 232 of each of the straps 228 provides both a camming surface for an automatic engagement of the straps with the lugs 230, and a manual means for grasping and releasing the straps.

The saw blade attachment 194 is completed by the provision of a spring loaded guard 234 which mounts on the support arm 200 through the rearmost bolt assembly 202 for a spring biased pivotal movement toward and away from enclosing engagement with the toothed edge of the blade 196. As will be noted in the cross-sectional view of FIG. 23, a spacer or spacing collar 236 can be provided as a part of the guard mounting bolt assembly 202 as a bearing means for the side of the saw blade 196 remote from the support arm 200. Such a spacer is considered highly desirable so as to center the blade 196 between the two gripping edges 238 provided on the guard 234. This in turn is of particular significance in view of the function of the guard 234 as a means for gripping, stabilizing and even feeding a limb, branch or similar workpiece relative to the reciprocating blade 196. The use of a single reciprocating blade 196 results in an even greater reliance on the support and stabilizing effect provided by the biased guard 234 in that the degree of stability which could be attributed to the oppositely reciprocating blades of the prior embodiments is not present.

While different means can be used to provide for the positive workpiece gripping bias on the guard 234, the preferred use of a coiled tension spring 240 has been illustrated. The spring will engage between a lug 242 projecting laterally from the support arm 200 and a point of engagement, for example aperture 244, on one side panel of the guard 234 at a point to the opposite side of the pivotal mounting of the guard from the edge enclosing portion thereof. As with the previously described guards, the guard 234 will include ramped edges at the distal end thereof which, projecting a substantial distance from the forward end of the saw blade 196, enable a convenient means for introducing the workpiece to the cutting edge of the blade and between this edge and the toothed edges 238 of the guard.

FIGS. 25 through 28 illustrate a simplified form of combined trimmer 246 and saw blade assembly 248 wherein the toothed saw blades 250 are each integrally formed with one of the two provided reciprocally driven trimmer blades 252.

While the saw assembly can, as with the previously described embodiments, incorporate single cutting edges and an associated guard mounted on the stabilizer bars 254, in this instance both the saw blades 250 and the trimmer blades 252 have been presented as being double edged. In order to reduce as much as possible interference from the integrally formed double edged saw blades 250 during the use of the trimmer 246, it will be noted that the width of the saw blades 250 is substantially less than that of the trimmer blades 252 with the toothed working edges of the saw blades 250 being in general alignment with the base ends of the trimmer blade knives 256.

As with the previous double bladed devices, it is contemplated that the integral saw blades 250 and trimmer blades 252 be opposite and equally reciprocated, utilizing any appropriate drive means 258.

The trimmer blades 252 will be retained between the opposed stabilizer bars 254 by two or more through-bolt assemblies 260 engaged through elongated reciprocation allowing slots 262 within the trimmer blades 252. Spacers 264, received within the slots 262, may be used as desired. The saw blades 250, integral extensions of the trimmer blades 252, will be retained in adjacent free sliding relation with each other by appropriate means such as rivet 266 extending through the saw blades toward the outer ends thereof, one blade having an aperture which closely receives the tank of the rivet 266 and the other blade incorporating an elongated slot 268 so as to enable the relative movement between the blades.

As possibly best seen in FIG. 28, the toothed working edges of the saw blades 259 incorporate teeth which are alternately straight and laterally outwardly set in a kerf set of the type more fully illustrated in FIGS. 11 through 15. The edges of the teeth of these blades 250 are similarly beveled on the outer faces thereof so as to, through engagement with the workpiece, have a constant inward biasing force introduced thereto. In this manner the blades are retained closely adjacent each other so as to define a single kerf and enhance efficient operation of the blades.

It will be noted that the double-edged apparatus contemplated in this particular embodiment does not necessarily incorporate a guard of the type previously described. The use of double reciprocating blades in itself provides a substantial degree of stability and can in itself provide for effectively cut limbs and the like wherein some appreciable degree of beam strength is present.

FIGS. 29 through 32 illustrate a further variation of the invention wherein the saw blade assembly 270, rather than projecting longitudinally from the distal end of the trimmer assembly 272, mounts longitudinally along the trimmer blades 274 inward of the distal ends thereof with the two saw blades 276 individually affixed to the two trimmer blades 274 and oriented with the toothed working or cutting edges 278 thereof oppositely directed relative to the cutting or knife bearing edges 280 of the trimmer blades 274.

The basic trimmer 272 includes, in addition to the aforementioned blades, appropriate means 282 for an opposite reciprocal driving of the blades, and opposed stabilizer bars 284 positioned along the outer faces of the two trimmer blades 274 for practically the full length thereof.

In order to mount the saw blade assembly 270, the basic trimmer 272 has both the stabilizer bars 284 and the trimmer blades 274 modified to accommodate, respectively, a guard mounting clip 286 and the two saw blades 276. Each of the stabilizer bars 284, inward from the distal or forward end 288 thereof a distance slightly greater than the length of the saw blades 276, includes a recess 290 in the outer face thereof defined by a tapered arcuate edge portion along that edge of the bar 284 which corresponds to the back edge of the trimmer blades 274, or the edge opposed from the knife bearing edges 280 thereof. Within, or in alignment with each of the recesses 290, at approximately mid height on the stabilizer bar 284, a longitudinally extending depression or recess 292 is provided.

The modification of the trimmer blades 274 includes a recess 294 defined within the inner surface of each blade 274. This recess is coextensive in length to the length of the saw blades 276 and extending inwardly from the back edge of the trimmer blade 274 to a point beyond mid-height and just short of the root areas of the knives on the trimming edge 280. A pair of elongated bolt accommodating slots 296 are provided at longitudinally spaced points along each of the recesses 294. These slots 296 preferably are positioned approximately on the center line of the trimmer blade 274 between the back edge thereof and a line generally along the root ends of the knives. Aligned with each of the slots 296, both thereabove and therebelow are a pair of relatively smaller longitudinally extending lug receiving slots 298.

Each of the saw blades 276 includes, toward the back edge 300 thereof, a pair of longitudinally spaced elongated slots 302 which, upon a placing of the blade 276 in seated position within the corresponding trimmer blade recess 294, align with the elongated slots 296. It is to be appreciated that the blade portion received within the recess 294 closely conforms to the recess with the recess being of a depth substantially equal to the thickness of the blade. In this manner, upon a seating of both saw blades 276, the trimmer blades 274 retain their original spacing, notwithstanding the mounting of the saw blades 276 therebetween.

Each of the blades 276 is retained in position relative to the corresponding trimmer blade 274 by means of laterally projecting lugs 304 formed from the blade itself and extended into the lug receiving slots 298 positioned immediately above and below the bolt receiving slots 296 of each of the trimmer blades 274. The lugs 304 are of a width substantially equal to the reduced thickness of the trimmer blades 274 in the vicinity of the recesses 294 therein whereby the lugs, while being completely received within the lug receiving slots 298, do not project therebeyond. As will be appreciated from FIG. 32 in particular, one lug of each pair of lugs is formed integrally with the back edge 300 of the blade 276 while the other lug 304 is struck from the body of the blade.

After a positioning of the saw blades 276, these blades, the trimmer blades 274 and the stabilizer bars 284 are locked together by a pair of bolts 306 which extend through the aligned slots 296 and 302, and bolt holes 308 within the opposed stabilizer bars 284. The bolts 306, as will be apparent, each include an enlarged head on one end thereof and a threaded nut received on the second end thereof. Further, so as to facilitate movement of both the trimmer blades 274 and the saw blades 276, appropriate spacers or bearings 310 can be provided about each bolt 306 between the stabilizer bars 284 and within the aligned slots 296 and 302. Mounted in this manner, it will be appreciated that the saw blades 276 are rigid with the trimmer blades 274 and are thereby reciprocally driven in equal and opposite directions. It is contemplated that the teeth along the toothed edges 278 of the blades 276 be formed in the manner described in detail in conjunction with FIGS. 11 through 15. In other words, straight and outwardly offset teeth are to alternate along the edge 278 of each of the blades 276 with each of the teeth including a beveled outer surface whereby a reaction force developed from engagement with the workpiece tends to force the blade edges laterally inward toward each other to define a single kerf and substantially enhance the efficiency of the operation of the blades. As with the previously described embodiments, the oppositely reciprocating blades also tend to increase the stability of both the saw blade assembly and the workpiece engaged thereby.

Referring now to the guard mounting clip or bracket 286, it will be noted that this clip is formed of a single metal plate centrally folded to define an arcuate bight portion 311 and two duplicate side panels 312, each of which includes a stepped upper portion having outwardly curled edges 314 and 316. The curled edge 314 is defined on the lower step and extends rearwardly from the forward edge of the clip 286 for a major portion of the length of the clip. The outwardly curled edge portion 316 is defined on the upper step and extends along the remainder of the length of the clip 286. The curl 316 is of a substantially greater arc than the curled edge 314 and defines a hand grip means for the clip 286 used when mounting the guard on the trimmer assembly 272.

Each of the side panels 312 of the guard mounting clip 286 includes a generally centrally located inwardly deformed elongated lug 318 which is of a size so as to be closely and snugly received within the elongated depression or socket 292 formed within the corresponding stabilizer bar 284 in alignment with the tapering recess 290 therein. The mounting clip or bracket 286 is applied to the trimmer assembly 272 by an inward sliding thereof with the lugs 318 moving into and along the opposed tapered recesses 290 until the lugs 318 drop into locked position within the recesses 292. This movement can be facilitated by a grasping of the hand holds 316 and either directly pulling the bracket 286 or slightly outwardly springing the panels 312. It is to be appreciated that the clip or bracket 286 is to incorporate a degree of resiliency which is sufficient to allow for the slight outward springing of the panels 312 relative to each other for a mounting and removal of the bracket. At the same time, the bracket 286 is to incorporate sufficient rigidity, when mounted, to provide a stable non-loosening interlock with the stabilizer bars 284 of the apparatus.

The bracket 286 further includes an outwardly extending stud 320 forward of and in alignment with each of the elongated recesses 318 on each of the side panels 312. Finally, each of the side panels 312 includes a downwardly and forwardly arcing slot 322 positioned generally below the forward portion of the inwardly directed elongated recess 318.

The guard 324 itself is similar to the previously described guards in that it includes side panels 326 having, along the length of the cutting edges 278 of the blades 276, elongated either straight or slightly arcuate toothed upper edges terminating, at the forward ends thereof, in a ramp-like portion 328 which projects forward of the operating blades 276 to define a means for engaging and introducing a workpiece without requiring a direct manual handling of the guard or the workpiece. The lower edges of the panels are interconnected by a transverse full length base panel 330. The rear portions of the panels 326 are of a relatively greater height than the toothed portions thereof and project upwardly to overlie the forward portions of the side panels 312 of the bracket 286. The guard, through opposed apertures in the rear portions of the guard side panels 326, pivotally mounts on the opposed laterally projecting studs 320. This can be effected by an actual folding of the guard 326 into its operative configuration over the bracket 286 to directly engage the apertured side panels over the studs 320.

Pivotal movement of the guard 324 is limited by a pair of inwardly directed pins 332 fixed to the guard side panels 326 and slidably received within the arcuate slots 322. This pivotal movement will extend from a closed position, as illustrated in FIG. 29, wherein the toothed edges 278 of the saw blades 276 are enclosed, but not directly contacted, and an outwardly swung position sufficient so as to accommodate the largest contemplated limb or branch, this being approximately three inches in diameter.

As with the previously described guards, the guard 324 is to be spring biased toward a closed position under a relatively substantial force which, while easily overcome in introducing the workpiece by an engagement of the ramped edges 328 therewith, is sufficient to firmly grip and stabilize the workpiece, especially in those instances wherein the workpiece has little inherent beam strength, to enable an effective severing thereof by the operation of the reciprocating blades 276. It is also contemplated that the biasing force on the guard 324 be such to actually contribute to a feeding of the blades through the workpiece. This biasing force is provided by a pair of springs 334, each including a central convolute portion 336 received over one of the studs 320, a first upwardly projecting L-shaped arm 338 seated and retained under the overlying outwardly curled edge portion 314, and a second straight depending arm 340 received within a socket 342 inwardly formed from the adjoining side panel 326 of the guard 324. The two springs 334 are so oriented as to apply a constant force biasing the guard 324 to the closed position thereof as presented in FIG. 29. In addition, the springs 334 will allow for the full range of movement of the guard 324 as allowed by the guide slots 322 on the bracket 286.

Several variations of the basic construction of FIGS. 29 through 33 are also contemplated. For example, while the saw apparatus 270 has been illustrated as extending along only a minor portion of the length of the trimmer apparatus 272, if so desired, the saw blade apparatus 270 can be coextensive with the trimmer apparatus. In other words, the saw blades 276 will be equal in length to the trimmer blades 274. Likewise, the blade apparatus can incorporate a single reciprocating blade mounted on one of the trimmer blades for reciprocation therewith. Such an arrangement will normally rely on cooperation between the biased guard and the single blade to provide an effective cutting operation in that the inherent stability of the reversely operating reciprocating blades will not be present.

FIG. 33 illustrates a further variation of the apparatus of the invention wherein each of the two oppositely reciprocating blades 342 combine the aspects of the previously combined trimmer blade and saw blade into an integral unit incorporating trimmer teeth 344 along one edge thereof and saw teeth 346 along the second longitudinal edge thereof.

In this embodiment of FIG. 33, the saw blade portions can be of approximately equal length with the trimmer blade portions, as illustrated. Alternatively, the length of the saw blade portions can be relatively shorter, for example the approximate length of the saw blades 276 in FIG. 29. Similarly, while no guard has been illustrated in conjunction with the embodiment of FIG. 33, an appropriate guard, for example similar to the guard 184 in FIG. 17, can be mounted thereon and used as both a protective enclosure for the saw teeth 346, particularly during the use of the apparatus in the manner of a conventional hedge trimmer, and as a means for, in combination with the reciprocating blades, grasping, stabilizing and feeding the limb relative to the saw teeth.

The saw teeth 346 themselves are formed, preferably, in the manner previously set forth in conjunction with FIGS. 11 through 15 wherein alternate teeth are within the plane of the blade and laterally outwardly offset with both sets of teeth including beveled outer edges which provide for a constant inward biasing of the blades toward each other during the operation thereof. In this manner, all of the previously described advantages of efficient operation, single kerf, and the like, are achieved.

FIG. 34 illustrates apparatus which differs from the apparatus of FIG. 33 only in that the trimmer teeth have been eliminated. Thus, the apparatus of FIG. 34 comprises basically a pair of reciprocating saw blades 348 which, through the cooperating beveled and selectively laterally offset teeth 350, operate in the manner heretofore described. The double reciprocating action in itself provides a highly efficient stabilizing effect on the limb during the sawing thereof. This effect is further enhanced by the use of a spring-loaded guard 352 mounted in any appropriate manner for cooperative use in conjunction with the reciprocating blades. The guard 352, as will be appreciated from the drawing, pivots open in opposition to the reciprocating blades for the introduction, retention, and biasing of a limb or the like, all as previously described with those forms of the apparatus set forth in more detail supra.

FIG. 35, illustrating apparatus wherein a single reciprocating blade 354 is provided, emphasizes the unique combination of a reciprocating blade and the spring-loaded guard 356 which covers and encloses the saw teeth 358 while at the same time allowing for a selective exposure of these teeth to an introduced workpiece. It is to be appreciated that the spring load on the guard is sufficient to exert a positive clamping force on an introduced limb or the like for cooperation with the reciprocating blade in a stabilization of the limb and as a means to assist in the smooth movement of the blade through the limb either alone or with an additional assist from the operator of the device. As will be appreciated from the drawings, the guard 356 incorporates all of the desired features previously described, including the ramped forward edge and the gripping teeth.

FIGS. 36 and 37 present a final form of apparatus to be specifically illustrated. In the apparatus of FIGS. 36 and 37, a pair of oppositely reciprocating blades 360 incorporate only saw toothed edges 362. These edges utilize the previously described tooth arrangement wherein planar and laterally offset teeth alternate with each other with each set of teeth incorporating the outer bevel edges which translate engagement with the kerf as it is being cut into lateral inward forces to maintain the blades as close together as possible. This in turn provides for a smoother kerf, and in fact a single kerf rather than a rough double kerf as would be encountered were the blades allowed to separate.

In this form of the apparatus, a guard 364 is utilized which is pivotally mounted, as at 366, on the opposed stabilizer bars 368, the blades 360 being appropriately slotted for an accommodation of the bolt or pin defining the pivot 366. The guard 364, as will be appreciated from the drawings, pivots over the upper or smooth edges 370 of the blades 360 and is of a height, when closed, to extend beyond the toothed working edges 362.

The guard 364 itself consists of opposed full length panels 372 and a top panel 374 which lies against the upper edges 370 of the blades 360 in the closed position of the guard. This top panel 374 also includes a rear edge 376 which acts as a stop, engaging the upper blades edges 370 and limiting the open position of the guard 364 to avoid an unintentional rearward flipping of the guard completely away from the cooperating blades.

The guard 364 is biased toward a closed position by an appropriate coiled tension spring 378 engaged between a depending ear 380 on one of the side panels 372 of the guard 364 and a similar depending ear 382 depending from a portion of the support structure for the reciprocating blades and power assembly therefore. The spring 378 is positioned below the pivot element 366 to insure a rotation of the guard to its closed position.

In use, the blades 362 are introduced directly into engagement with the workpiece or limb with the guard 364 engaging the workpiece as the blades move therethrough and pivoting rearwardly, about element 366, against the constant biasing force of the spring 378. Once a severing of the workpiece is completed, the guard returns to its position automatically enclosing the blades.

The foregoing is considered illustrative of the principles of the invention. Since further modifications and variations, incorporating the principles of the invention, may occur to those skilled in the art, it is not desired to limit the invention to the exact constructions and operations shown and described. Rather, all suitable modifications, equivalents and variations may be resorted to, falling within the scope of the invention as claimed.

We claim:

1. In a reciprocating cutter, a support, a pair of parallel laterally adjacent trimmer blades, each of said trimmer blades having a proximal end, a distal end, inner and outer faces, and opposed longitudinal edges, means mounting said trimmer blades on said support for opposite reciprocating movement relative to each other, one of said longitudinal edges constituting a working edge and including shearing knives therealong, a pair of saw blades generally coplanar with and rigid with said trimmer blades for reciprocating movement therewith, each of said saw blades having a proximal end, a distal end, inner and outer faces, and opposed longitudinal edges, one of the longitudinal edges of each saw blade constituting a working edge and having saw teeth defined therealong.

2. The reciprocating cutter of claim 1 wherein selected ones of the teeth of each saw blade working edge are formed in the plane of the blade, the remainder of the teeth of each saw blade working edge being set out of the plane of the blade in a direction laterally away from the plane of the other saw blade.

3. The cutter of claim 2 wherein said saw blades are engaged with and extend longitudinally forward from the distal ends of the trimmer blades.

4. The cutter of claim 3 including means releasably mounting said saw blades on said trimmer blades for selective removal therefrom.

5. The cutter of claim 3 including a guard, means mounting said guard on said cutter adjacent the proximal end of the saw blades for movement of the guard between a closed position overlying and enclosing the working edges of the saw blades and an outward position exposing the working edges of the saw blades, and means for controlling the movement of the guard.

6. The cutter of claim 5 wherein the movement of said guard is a pivotal movement, said means for controlling movement of the guard including spring means resiliently biasing said guard to the closed position thereof, said spring means allowing opening movement of the guard away from said saw blades upon introduction of a workpiece between the guard and the working edges of the saw blades, said guard acting to stabilize and retain an introduced workpiece against the saw blades during the reciprocation of the saw blades.

7. The cutter of claim 6 wherein the guard includes a pair of laterally spaced side panels positionable in overlapped relation to the opposite sides of the pair of saw blades in the closed position of the guard, each of said side panels including an outer edge and an inner gripping edge defined therealong, said inner gripping edge being in generally opposed and laterally spaced relation to the working edges of the saw blades for engagement with a workpiece in opposition to the saw blade working edges.

8. The cutter of claim 7 wherein the gripping edge of each side panel extends forwardly of the saw blades and terminates in a forward edge portion defining a ramp edge, each ramp edge being angled rearwardly from the outer end of the side panel and upwardly toward the gripping edge thereof.

9. The cutter of claim 8 wherein the means for releasably mounting said saw blades includes laterally outwardly projecting studs fixed to the outer faces of said trimmer blades adjacent the distal ends thereof, and clips fixed on the outer faces of the saw blades and projecting rearwardly from the proximal ends thereof, said clips having apertures defined therein for selective reception of the trimmer blade studs.

10. The cutter of claim 9 wherein said support includes a stabilizer bar extending longitudinally along the outer face of at least one of said trimmer blades, means mounting said trimmer blades on the stabilizer bar for reciprocating movement relative thereto, at least one support arm extending longitudinally along the outer face of one of said saw blades, means mounting said saw blades on said support arm for reciprocating movement relative thereto, and means for releasably and rigidly interlocking said support arm to said stabilizer bar whereby said support arm comprises a rigid extension of said stabilizer bar.

11. The cutter of claim 10 wherein the means for releasably and rigidly interlocking said support arm to said stabilizer bar comprises a longitudinal rib rigid with one of these members and a rib receiving groove defined in the second of these members.

12. The cutter of claim 4 wherein the means for releasably mounting said saw blades includes laterally outwardly projecting studs fixed to the outer faces of said trimmer blades adjacent the distal ends thereof, and clips fixed on the outer faces of the saw blades and projecting rearwardly from the proximal ends thereof, said clips having apertures defined therein for selective reception of the trimmer blade studs.

13. The cutter of claim 12 wherein said support includes a stabilizer bar extending longitudinally along the outer face of at least one of said trimmer blades, means mounting said trimmer blades on the stabilizer bar for reciprocating movement relative thereto, at least one support arm extending longitudinally along the outer face of one of said saw blades, means mounting said saw blades on said support arm for reciprocating movement relative thereto, and means for releasably and rigidly interlocking said support arm to said stabilizer bar whereby said support arm comprises a rigid extension of said stabilizer bar.

14. The cutter of claim 1 wherein the inner face of each trimmer blade has a recess defined therein extending inwardly from the distal end thereof, each recess being of a depth substantially equal to the thickness of a saw blade for reception of the corresponding saw blade therein, and means engaged between the recessed portion of each trimmer blade and the portion of the corresponding saw blade received therein to lock the saw blade within the recess against relative longitudinal movement therebetween.

15. The cutter of claim 14 wherein the saw blades extend inwardly along said trimmer blades from the distal end of said trimmer blades, said saw blades projecting outwardly from the longitudinal edges of the trimmer blades opposed from the trimmer blade working edges, the longitudinal edges of the saw blades remote from the trimmer blades comprising the working edges thereof, the working edges of the saw blades being oppositely directed relative to the working edges of the trimmer blades.

16. The cutter of claim 15 including a guard, means mounting said guard on said cutter for movement of said guard between a closed position overlying and enclosing the working edges of the saw blades, and an outward position remote from the saw blade working edges.

17. The cutter of claim 16 wherein movement of the guard is along a pivotal path, spring means resiliently biasing said guard to the closed position thereof, said spring means allowing opening movement of the guard away from the saw blades upon introduction of a workpiece between the guard and the working edges of the saw blades.

18. The cutter of claim 17 including means mounting said guard including a mounting bracket releasably engageable with said support, said guard being pivotally secured to said bracket for mounting therewith, and cooperating means on said bracket for limiting the pivotal movement of the guard relative to the bracket.

19. The cutter of claim 1 wherein said saw blades are integral extensions of said trimmer blades.

20. The cutter of claim 19 wherein said saw blades extend longitudinally from the distal ends of said trimmer blades.

21. The cutter of claim 20 wherein both of the longitudinal edges of said saw blades constitute toothed working edges.

22. The cutter of claim 19 wherein said saw blades are coextensive with said trimmer blades for at least a portion of the length of said trimmer blades inward from the distal end thereof, the working edges of the saw blades paralleling and being oppositely directed relative to the working edges of the trimmer blades.

23. The cutter of claim 1 including a guard, means mounting said guard on said cutter adjacent the proximal end of the saw blades for movement of the guard between a closed position overlying and enclosing the working edges of the saw blades and an outward position exposing the working edges of the saw blades, and means for controlling the movement of the guard.

24. In a reciprocating cutter, a support, a pair of parallel laterally adjacent trimmer blades, each of said trimmer blades having a proximal end, a distal end, inner and outer faces, and opposed longitudinal edges, means mounting said trimmer blades on said support for opposite reciprocating movement relative to each other, one of said longitudinal edges constituting a working edge and including multiple shearing knives therealong, at least one saw blade generally coplanar with and rigid with one of said trimmer blades for reciprocating movement with said trimmer blade, said saw blade having a proximal end, a distal end, opposed faces and opposed longitudinal edges, one of said saw blade longitudinal edges constituting a working edge having multiple saw teeth defined therealong.

25. The cutter of claim 24 including a guard, means mounting said guard on the cutter adjacent the proximal end of the saw blade for movement of the guard between a closed position overlying and enclosing the working edge of the saw blade, and an outwardly pivoted position exposing the working edge of the saw blade, and spring means resiliently biasing said guard to the closed position thereof, said spring means allowing opening movement of the guard away from said saw blade upon the introduction of a workpiece between the guard and the working edge of the saw blade, said guard acting to stabilize and retain an introduced workpiece against the saw blade working edge during the reciprocation of the saw blade.

26. The cutter of claim 24 including means releasably mounting said saw blade on one of said trimmer blades for selective removal therefrom, said means for releasably mounting said saw blade including laterally outwardly projecting studs fixed to the associated trimmer blade adjacent the distal end thereof, and clips fixed on said saw blade and projecting rearwardly from the proximal end thereof, said clips having apertures defined therein for selective reception of the trimmer blade studs.

* * * * *